Oct. 15, 1940.                 O. B. ACKERLY, JR                  2,218,206
                                    FILTER
                            Filed June 23, 1936              2 Sheets-Sheet 1
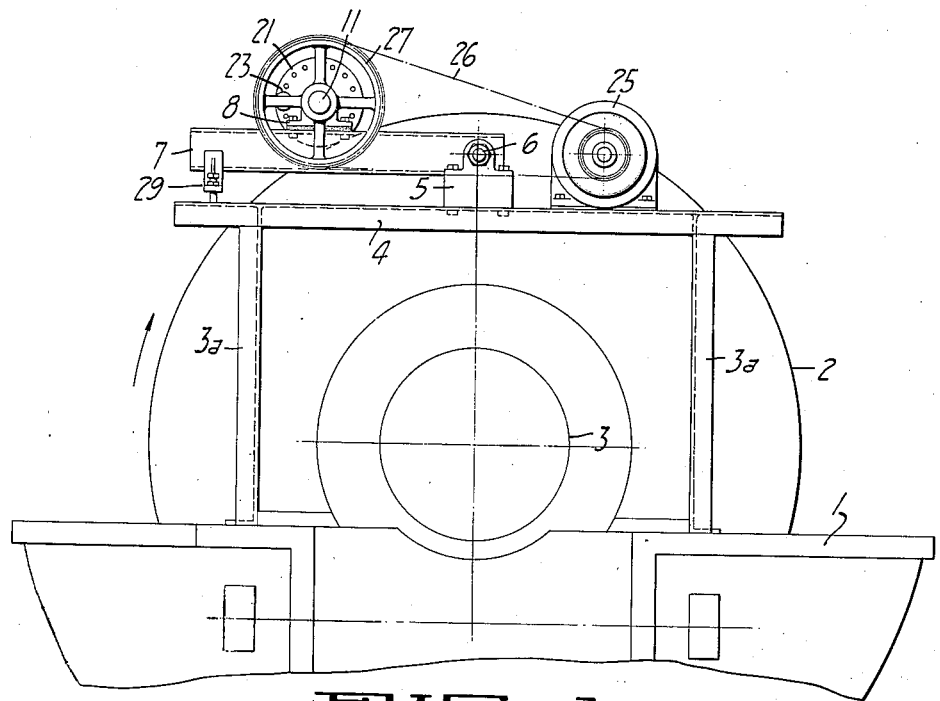
FIG_1_
FIG_2_
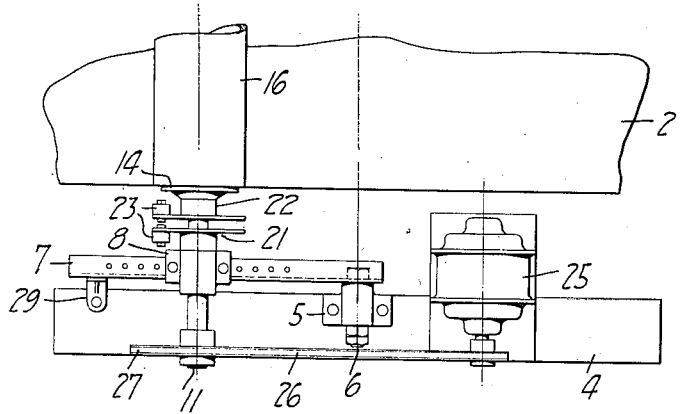
INVENTOR.
Orville B. Ackerly Jr.
BY
                    ATTORNEY.

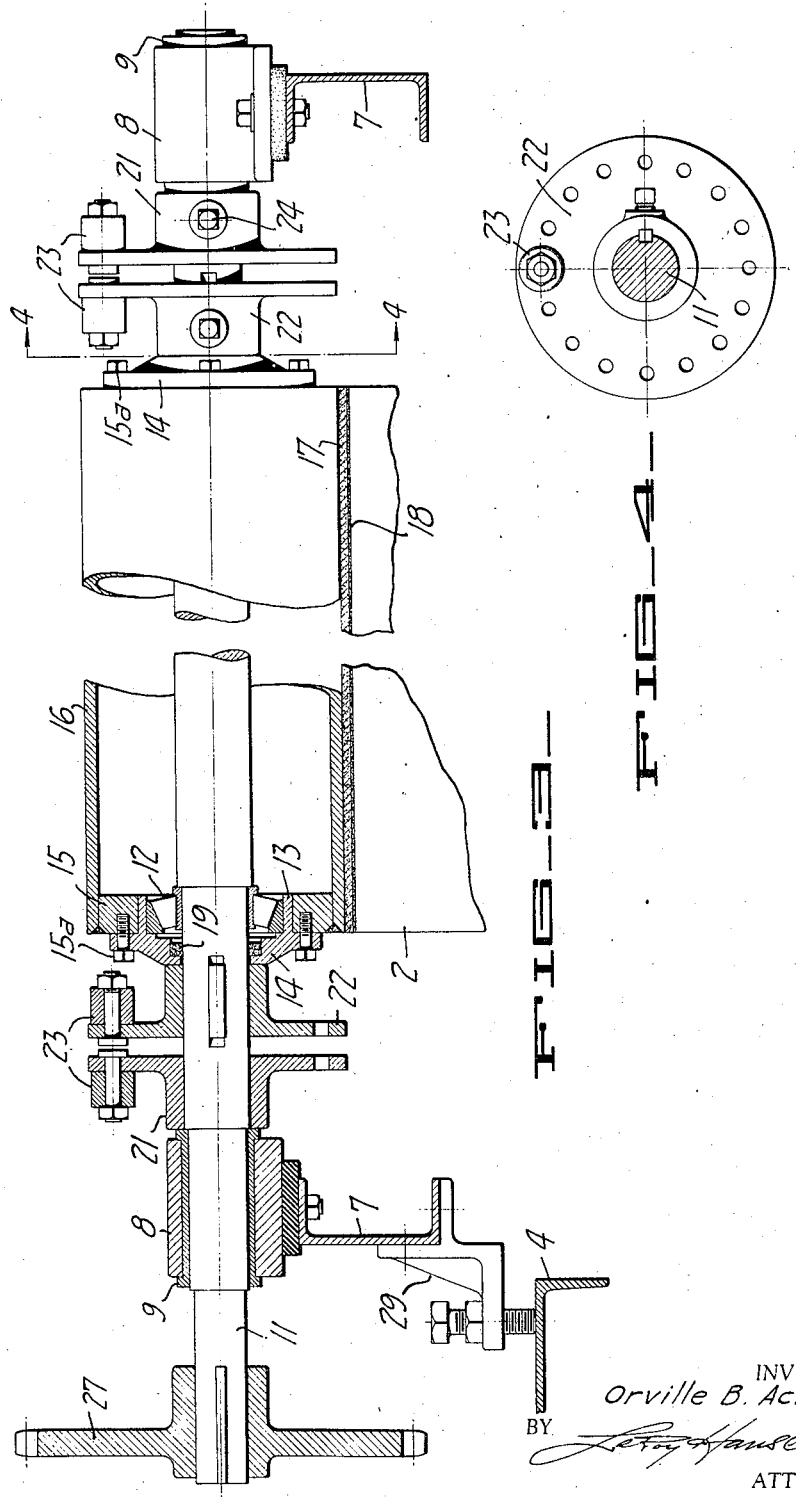

Patented Oct. 15, 1940

2,218,206

UNITED STATES PATENT OFFICE 2,218,206

FILTER

Orville B. Ackerly, Jr., Piedmont, Calif., assignor to Oliver United Filters Incorporated, San Francisco, Calif., a corporation of Nevada Application June 23, 1936, Serial No. 86,791

9 Claims. (Cl. 210—199)

This invention relates to filters and particularly to a device for lowering the moisture content of the cake or layer of pulp formed and supported on the filter medium of a continuous rotary filter.

The normal cycle of operation of a continuous rotary drum or disc filter comprises cake formation, cake washing, cake drying, and cake discharge. The first three phases, that is, cake formation, washing, and drying, are effected under the influence of a differential pressure, usually vacuum but sometimes involving the use of a super-atmospheric pressure. With some types of cakes it is found that a point is reached in the drying cycle at which a continued application of vacuum results in no further decrease of the moisture content of the cake. This may be due either to the fact that the particles forming the cake have become interlocked, thereby forming an impervious structure, or to the fact that cracks have formed in the cake through which the air passes, rather than passing uniformly through the entire body of the cake. Obviously the air takes the path of least resistance, and therefore when a condition of this character arises the further application of vacuum is of no avail.

The object of this invention is to rearrange the particles forming the layer of cake so that interstitial spaces will be formed through which the air may be made to pass uniformly throughout the surface of the cake and thereby displace further particles of moisture.

A further object of this invention is the provision of means whereby any cracks that may have formed in the cake may be sealed.

More specifically, the object of the invention is the provision of a freely rotatable roll arranged to engage the outer surface of the cake and supported by means of an eccentrically weighted floating shaft so that when the shaft is rotated the roll will be caused to vibrate in a direction perpendicular to the axis of the shaft.

The invention possesses other advantageous features, some of which with the foregoing will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

Referring to the drawings:

Figure 1 is an end elevation of a continuous rotary drum filter provided with a vibrating roll.

Figure 2 is a fragmentary plan view of the filter shown in Figure 1.

Figure 3 is a side elevation of my vibrating roll, partly in section more clearly to disclose its construction.

Figure 4 is a section taken on the line 4—4 of Figure 3.

As shown in Figure 1, my invention may be used in combination with a rotary drum filter 10 of the type disclosed in the Oliver Patent No. 919,628 of April 27, 1909, which comprises a pulp tank 1 within which is adapted to rotate a drum 2. The drum is supported on a shaft or trunnions not shown, which in turn is or are associated with an automatic valve 3 by means of which the filtrate compartments formed on the periphery of the drum 2 may be successively subjected to vacuum, atmospheric pressure, or a positive reverse pressure for discharging the cake formed and supported on the drum.

To each end of the tank 1 is secured a frame member comprising a pair of spaced vertical channels 3ª, to the upper ends of which are secured spreader channels 4. Brackets 5 are bolted to the spreader channels 4, and pivoted to the ends of these channels by means of pins 6 are rocker arms 7. Secured intermediate the ends of each rocker arm 7 is a bearing housing 8 which may be made vertically adjustable by the use of a screw or jack (not shown). Journaled within bearings 9 secured to the bearing housing 8 is a shaft 11 carrying intermediate its ends a pair of spaced roller bearings 12. The roller bearings 12 are accommodated within a housing 13 formed in end members 14, and these end members are secured to rings 15 by screws 15ª. The rings 15 support a roll 16 extending across the entire face of the rotary drum 2 and adapted to engage the cake 17 formed and supported on the filter medium 18. Each end member 14 may if desired be provided with a stuffing box 19 for the purpose of preventing oil used in lubricating the roller bearings 12 from leaking out.

Threaded on the shaft 11 adjacent either end of the roll 16 are pairs of flanged collars 21 and 22, each of which is provided with an eccentric weight 23. The inner collars 22 are keyed to the shaft 11, while the outer collars 21 may be adjustably secured to the shaft 11 by set screws 24 so that the eccentric weights 23 of each pair of collars 21 and 22 may be rotated relative to each other.

Supported on the spreader channel 4 on the valve side of the filter is a motor 25 adapted to drive by means of a chain 26, a sprocket wheel 27 keyed to the outer end of the shaft 11.

The speed of the motor 25 and the gear ratios between the motor sprocket and sprocket 27 should be such that the shaft 11 will revolve at the rate of approximately 900 R. P. M. This rate of rotation is not critical and may be 800 or 1000 R. P. M. However, care must be taken not to drive the shaft at such a speed that the roll 16 will function as a couch roll. Due to the fact that the collars 21 and 22 are eccentrically weighted, the shaft 11 will vibrate 900 times per minute in a direction perpendicular to its axis. The vibration of the shaft 11 produces a corresponding vibration in the roll 16. It should be particularly noted that since the roll 16 is free to rotate with respect to the shaft 11, and is in contact at all times with the cake 17, it is driven by frictional engagement with the cake. The roll 16 and the cake have therefore no relative motion with respect to each other at their line of contact and this feature is of considerable importance for the reason that if relative motion between the cake and the roll 16 were permitted, the cake would be torn away from its supporting filter medium.

Since the shaft 11 is carried by the rocker arms 7 which in turn are pivotally secured to the spreader channels 4, it will be seen that the roll 16 is free to move in a vertical direction and if allowed to rest on the cake carried by the drum 2 will follow any irregularities of the drum. The depth to which the roll 16 is embedded in the cake 17 depends upon the weight of the roll and its supporting mechanism as well as on the density of the cake. In some instances it may be desirable to provide vertically adjustable stops 29 disposed between the spreader channels 4 and the rocker arms 7 for the purpose of limiting the downward movement of the rocker arms and thereby preventing the roll 16 from becoming too deeply embedded in the filter cake.

In using the device above disclosed, the filter is put into operation in the usual manner. The cake is formed under the influence of vacuum and the vacuum is maintained on the filter compartments until the point of discharge has been reached. The roll 16 is preferably located on the rising side of the drum and due to its vibration in contact with the cake is effective in closing or sealing all cracks that may have developed in the cake, as well as in rearranging the particles forming the cake. Apparently this rearrangement of the particles results in the formation of interstitial spaces through which the moisture content of the pulp may pass and be displaced with air. The vibration of the roll causes a visible film of moisture to appear at the point of impact, and this moisture is forced through the interstices of the cake due to the differential pressure produced by the vacuum on its under side.

The rate of vibration of the shaft 11 and roll 16 may be controlled by adjusting the rate of rotation of the shaft 11 and obviously this may be done by utilizing a variable speed drive in connection with the motor 25. This amplitude of vibration may be controlled at will by adjusting the relative positions of the counterweights 23 carried on the collars 21 and 22. With the counterweights 23 in the position shown in Figure 2 the greatest amplitude would be obtained. By rotating the counterweights 23 of the collars 21 away from the associated counterweight, the amplitude can be decreased. To eliminate all vibration it is merely necessary to secure the counterweights of the collars 21 diametrically opposite to the counterweights on the fixed collars 22.

I claim:

1. A device of the character described comprising: a traveling foraminous support on which a layer of wet pulp is carried; a freely rotatable roll in contact with said pulp and supported on an eccentrically weighted, floating shaft; said shaft and roll being free to rotate relative to each other; means for subjecting the opposed surfaces of said pulp to a differential pneumatic pressure; and means for rotating said shaft.

2. A device of the character described comprising: a traveling foraminous support on which a layer of wet pulp is carried; a frame on either side of said support; a rocker arm pivotally secured to each frame; an eccentrically weighted shaft rotatably carried by said rocker arms and extending across said support; a freely rotatable roll supported on said shaft and adapted to contact said pulp; and means to rotate said shaft at a speed which will cause said roll to vibrate.

3. A device of the character described comprising: a traveling foraminous support on which a layer of wet pulp is carried; a frame on either side of said support; a rocker arm pivotally secured to each frame; an eccentrically weighted shaft rotatably carried by said rocker arms and extending across said support; a freely rotatable roll supported on said shaft and adapted to contact said pulp; means to rotate said shaft at a speed which will cause said roll to vibrate; and means for limiting the downward vertical movement of said rocker arms.

4. A device of the character described comprising: a traveling foraminous support on which a layer of wet pulp is carried; a freely rotatable roll in contact with said pulp and supported on a floating shaft; said shaft and roll being free to rotate relative to each other; adjustable eccentric weights associated with said shaft; means for subjecting the opposed surfaces of said pulp to a differential pneumatic pressure; and means for rotating said shaft.

5. A filter comprising a continuous series of movable filtrate compartments covered with a filter medium; a pulp tank through which said filtrate compartments are arranged to travel; a freely rotatable roll supported on a floating shaft and arranged to contact the cake formed and supported on said filter medium; means for maintaining said filtrate compartments under the influence of vacuum; and means for vibrating said roll in a direction perpendicular to its line of contact with said cake.

6. The method of decreasing the moisture content of a cake carried on the drum of a rotary drum filter comprising: engaging said cake with a freely rotatable roll; maintaining said cake under a differential pressure; and vibrating said roll in a direction perpendicular to its axis at a rate of approximately 900 vibrations per minute.

7. A device of the character described comprising: a traveling foraminous support on which a layer of wet pulp is carried; a compression member transversely disposed across and arranged to contact the pulp carried on said support; and means for vibrating said compression member in a plane substantially perpendicular to said support at the line of contact between said compression member and said support.

8. The process of treating a filter cake formed on a filtering medium which comprises: moving said filtering medium and the cake formed thereon past and in contact with a compression member immediately adjacent thereto, extending transversely thereof, and vibrating in a plane substantially perpendicular to said filtering medium.

9. A device of the character described, comprising: a continuously traveling foraminous support on which a layer of wet pulp is carried; a compression member transversely disposed across and arranged to contact the pulp carried on said support; and means for periodically moving said compression member into said pulp.

ORVILLE B. ACKERLY, Jr.